United States Patent
Heino et al.

(10) Patent No.: US 8,968,814 B2
(45) Date of Patent: Mar. 3, 2015

(54) METHOD FOR PREVENTING SCORCHING OF MILK-BASED PRODUCT

(75) Inventors: Antti Heino, Helsinki (FI); Juha Huumonen, Helsinki (FI)

(73) Assignee: Valio Ltd., Helsinki (FI)

( * ) Notice: Subject to any disclaimer, the term of this patent is extended or adjusted under 35 U.S.C. 154(b) by 152 days.

(21) Appl. No.: 13/140,903

(22) PCT Filed: Dec. 17, 2009

(86) PCT No.: PCT/FI2009/051007
§ 371 (c)(1),
(2), (4) Date: Jun. 20, 2011

(87) PCT Pub. No.: WO2010/070204
PCT Pub. Date: Jun. 24, 2010

(65) Prior Publication Data
US 2011/0256295 A1    Oct. 20, 2011

(30) Foreign Application Priority Data

Dec. 18, 2008    (FI) .................................... 20086211

(51) Int. Cl.
*A23C 9/15*    (2006.01)
*A23C 9/142*    (2006.01)

(52) U.S. Cl.
CPC ......... *A23C 9/1422* (2013.01); *A23C 2210/202* (2013.01); *A23C 2210/206* (2013.01)
USPC ............ 426/580; 426/490; 426/491; 426/587

(58) Field of Classification Search
USPC ......................... 426/478, 490, 491, 580, 587
See application file for complete search history.

(56) References Cited

U.S. PATENT DOCUMENTS

| | | | | |
|---|---|---|---|---|
| 4,834,994 A | * | 5/1989 | Kuwata et al. ................ | 426/271 |
| 5,503,864 A | | 4/1996 | Uchida et al. | |
| 2003/0059512 A1 | | 3/2003 | Kopf et al. | |
| 2007/0104847 A1 | | 5/2007 | O'Mahony et al. | |

FOREIGN PATENT DOCUMENTS

| | | |
|---|---|---|
| DE | 10 2006 053017 | 5/2008 |
| EP | 0 443 763 | 8/1991 |
| FR | 2 669 810 | 6/1992 |
| FR | 2 681 218 | 3/1993 |
| WO | 96/08155 | 3/1996 |
| WO | 98/09717 | 3/1998 |
| WO | 00/51440 | 9/2000 |

OTHER PUBLICATIONS

Nelson, B. K., Barbano, D. M., "A microfiltration process to maximize removal of serum proteins from skim milk before cheese making" J. Dairy Sci., vol. 88, No. 5, May 31, 2005, pp. 1891-1900.*
Nelson, B.K. et al., "A Microfiltration Process to Maximize Removal of Serum Proteins from Skim Milk Before Cheese Making", J. Dairy Sci., vol. 88, No. 5, (May 31, 2005).

* cited by examiner

*Primary Examiner* — Leslie Wong
(74) *Attorney, Agent, or Firm* — Nixon & Vanderhye P.C.

(57) ABSTRACT

The invention relates to a method for manufacturing a milk-based product from which whey proteins such as beta lactoglobulm have been substantially removed, and to the use of such a product as a milk product to be heated in cooking.

10 Claims, No Drawings

METHOD FOR PREVENTING SCORCHING OF MILK-BASED PRODUCT

This application is a National Phase of International Application No. PCT/FI2009/051007, filed 17 Dec. 2009, which designated the U.S. and claims priority to Finland Patent Application 20086211, filed 18 Dec. 2008, the entire contents of each of which are hereby incorporated by reference.

FIELD OF THE INVENTION

The invention relates to a milk-based product, which is heat stable and does not scorch during cooking.

BACKGROUND OF THE INVENTION

There are no heat stable milk products especially suitable for cooking or boiling on the market. Today, there is a great interest, need and demand in cookery for heat stable consumer-friendly milk products.

When milk or milk-based food is cooked in a saucepan on a stove, they easily burn on the bottom of the saucepan, causing a burnt flavour to the food and complicating the cleaning of the cookware. Also, an unpleasant film is formed on the surface of the cooked milk. The problem becomes apparent especially in households, where food is cooked on stoves and the temperature of the inner bottom of the saucepan rises high. The problem can be avoided or alleviated to some extent by specially coated cookware, for example. The equipment in institutional kitchens is designed so that the problem of scorching does not usually exist.

During cooking, food ingredients are usually heated in a cookware, saucepan, frying pan or the like on a hot stove. The heat from the stove is transmitted to the cookware and further to the food by conduction. In this type of cooking method, the temperature of the cookware bottom may be much higher than 100° C., i.e. considerably higher than the desirable food temperature. This means that food which is in long-term contact with the cookware bottom is subjected to a very high thermal load. Many foodstuffs cannot withstand the heat of the cookware bottom but stick and scorch onto the bottom of the cookware. In everyday life, food is said to burn on the bottom.

Scorching is harmful for many reasons. Burnt foodstuff causes unpleasant off-flavours, such as a burnt flavour when evaluated organoleptically, appearance defects, such as an untypical colour, and textural faults, such as detached, burnt black constituents, flakiness, precipitates, crust, burnt particles, to the food portion. Scorching of foodstuffs also complicates the cleaning of cookware and utensils. It is laborious to wash away the burnt foodstuff that has stuck tightly onto the bottom. As a result of scorching, the nutritional value of the foodstuff also mainly deteriorates. In addition, combustion products detrimental to health may also be formed.

It is known that scorching can be avoided by different cooking methods, such as heating in water bath, whereby the temperature of the cookware bottom does not rise above the boiling point of water but, on the other hand, heating takes a considerably longer time. Also, it is useful to stir the food actively, which shortens the time the foodstuff is in contact with the bottom. Scorching can also be avoided by cooking equipment, such as by means of a coated cookware (e.g. Teflon). In these cases, foodstuffs do not stick tightly to the bottom of cookware, such as a saucepan, but the scorching as such cannot be entirely avoided.

The sensitivity of foodstuffs to scorching varies a lot. It is well-known that milk or a milk-containing product is a foodstuff that easily burns on the bottom. The scorched matter mainly consists of protein, since proteins and, among milk proteins, whey proteins in particular are the most heat-sensitive substances of foodstuffs. Certain minerals may also affect the scorching phenomenon. There is a need for new solutions and more efficient methods focusing particularly on a milk raw material, which reduce or eliminate scorching and thus minimize the problems associated with heat treatments.

It is also well-known that skim milk or low-fat milk is more sensitive to scorching than whole milk. Consequently, the tendency of milk to burn on the bottom has been avoided by selecting fat-containing milks, such as whole milk, for cooking. According to today's nutrition recommendations, however, skim milk or at least low-fat milk should be used, which causes problems in cooking.

Milk contains many different proteins, the heat sensitivity of which varies considerably. Milk proteins, the portion of which in milk is about 3.3%, are divided into caseins and whey proteins. 20% of milk proteins are whey proteins, the rest are caseins. Caseins are not particularly sensitive to heat. The two largest components in whey proteins are β-lactoglobulin (β-lg) and α-lactalbumin (α-la). Particularly β-lactablogulin is heat-sensitive during a heat treatment.

As is known, milk proteins and particularly whey proteins can be removed from milk in various ways. By using micro- and ultrafiltration techniques and combinations thereof, heat-sensitive whey proteins and the obtained casein dispersion can be removed from a milk raw material and used for cheese production (Schreiber, R., Heat-induced modifications in casein dispersions affecting their rennetability, Intern. Dairy J., 11:2001, 553-558; Kulozik, U. and Kersten, M., New Ways for the Fractionation of Dairy and Minor Constituents Using UTP-Membrane Technology, Bulletin IDF 374:2002, 37-42; Heino, A. et al., Microfiltration of milk I: Cheese milk modification by micro- and ultrafiltration and the effect of Emmental cheese quality, Milchwissenschaft 63 (3) 2008: 279-282; Outinen, M. et al., Microfiltration of milk II: Influence of the concentration factor on the composition of Emmental cheese milk and the κ-casein macropeptide content of the whey, Milchwissenschaft 63 (3) 2008: 305-308).

Furthermore, WO publication 96/08155 describes the changing of the ratio of whey to casein by a micro- and ultrafiltration technique, whereby the obtained fractions may be used for cheese production.

Retail trade and consumers want to have milk products with a flawless flavour, appearance and texture and which withstand heating and high cooking temperatures and whose taste, appearance or texture do not change during the heating either. It is very challenging to achieve products with an absolutely flawless flavour, appearance and texture and which fulfil consumers' expectations on an unscorching milk product and have been manufactured simply and economically. It is an object of the invention to achieve milk-based products which satisfy these demands.

BRIEF DESCRIPTION OF THE INVENTION

An object of the present invention is to provide a method for manufacturing a milk-based product which does not scorch and from which whey proteins have been substantially removed. The invention is based on the surprising discovery that a milk product substantially free of whey proteins does not tend to burn on the bottom while being heat-treated or cooked. In addition, such a milk product does not have a burnt flavour or appearance and structural faults, which are typical for normal milk when heated intensely.

Another object of the invention is to provide a milk-based product which does not scorch, having a certain amount of β-lactoglobulin.

A further object of the invention is to provide a use of such a milk-based product free of whey proteins as a milk product to be heated or for food to be heated.

The present invention provides a new solution for avoiding flavour, appearance and textural defects, which have proven problematic for milk products, particularly low-fat and skim milk products.

DETAILED DESCRIPTION OF THE INVENTION

The invention relates to a method for manufacturing a milk-based product which does not scorch and from which whey proteins have been substantially removed. The invention thus provides a method for manufacturing a milk-based product particularly suitable for cooking.

In context of the present invention, the term "scorch" means a phenomenon where a milk-based product sticks and/or burns in extreme to the heated surfaces of cookware, like saucepans, while causing flaws in taste and appearance, like formation of flakes, deposits, sediments and particles or discolouring of the product, etc. Also, scorching is typically associated with deterioration of nutritive quality of the milk-based product.

The method of the invention comprises the following steps:
a) concentrating a milk raw material by microfiltration to provide an MF retentate fraction and an MF permeate fraction,
b) ultrafiltrating the obtained MF permeate fraction to provide a UF retentate fraction and a UF permeate fraction,
c) circulating at least a portion of the obtained UF permeate fraction back to the microfiltration as a diafiltration medium,
d) recovering the MF retentate obtained from step c),
e) if desired, heat-treating said MF retentate, hydrolysing its lactose, and/or standardizing the protein and lactose content,
f) if desired, combining at least a portion of the MF retentate obtained in step d) or e) with the milk raw material,
to provide a milk-based product having a β-lactoglobulin content of less than 0.10 g/100 g milk-based product.

In an embodiment of the invention, the milk-based product is a low-fat or skim milk product. In this invention, the term "low-fat or skim" means that the fat content of the milk-based product is at most 2.5%.

The milk raw material may be derived from an animal; it may be for example cow's or goat's milk as such or pre-treated in a desired manner.

In the context of the present invention, the milk raw material refers to milk, whey, and combinations of milk and whey as such or as a concentrate. The milk raw material may be provided with ingredients generally used in the preparation of milk products, such as fat, protein or sugar fractions, etc. The milk raw material may thus be, for instance, whole milk, cream, low-fat or skim milk, ultrafiltrated milk, diafiltrated milk, microfiltrated milk, or milk reconstituted from milk powder, organic milk or a combination of these or a dilution of any of these. Preferably, the milk raw material is skim milk.

The microfiltration of step a) comprises two microfiltration steps, whereby UF permeate is added to the latter microfiltration step at the same rate at which the permeate is produced (in other words, the second step is diafiltration). Preferably there are 2 to 3 diafiltration steps.

Microfiltration may thus also comprise more than two microfiltration steps. Different steps may comprise, for instance, changing of process conditions and/or filtration membranes. A variable condition may be, for instance, filtration temperature, filtration pressure, addition of diafiltration medium (diawater), and/or concentration factor of filtration. Conditions can be changed by one or more variables.

In the microfiltration comprising a plurality of microfiltration steps, more than one MF permeate fraction may be formed. If desired, these MF permeate fractions may be combined into MF permeate stream, which is then led to the next ultrafiltration step.

Microfiltration is performed at 5 to 55° C. in such a manner that in the first step the milk raw material is concentrated by a factor of 1 to 4.5, preferably 3.5 to 4.5, times by volume. The MF permeate is concentrated by ultrafiltration to 2 to 25%, preferably 2 to 10%, of the original volume.

The concentration factor (K) refers to the ratio of the volume of the liquid fed to the filtration to the retentate, and it is defined with the following formula:

$$K = \text{feed}(L)/\text{retentate}(L)$$

Microfiltration is typically performed with a concentration factor $K=20$ to 200, and ultrafiltration is typically performed with a concentration factor $K=20$ to 200. In the case of diafiltration, the concentration factor may be considerably larger. In a preferred embodiment of the invention, the total concentration degree in the filtration steps is over 4, preferably 20 to 70, particularly preferably 50 to 70.

According to the invention it is possible to separate whey proteins of the milk raw material from casein into different fractions by membrane techniques, when a polymeric or ceramic microfiltration membrane with a porosity of 0.05 to 0.5 μm is used. In ultrafiltration, membranes with a cut-off value of 1 to 20 kDa are typically used. Suitable ultrafiltration membranes are, for instance, DSS GR61PP (Alfa Laval AS, Denmark), HFK-131 (Koch membrane systems, Inc., USA). Suitable microfiltration membranes are, for instance, Synder FR (Synder Filtration, USA), Pall Membralox P19-40 (Pall Corporation, France).

If desired, some of the UF permeate fraction obtained in step b) is led further to nanofiltration and the obtained NF permeate is used for the diafiltration of the MR retentate fraction substantially free of whey proteins and/or for adjusting the protein and lactose content.

The UF permeate obtained from the UF filtration is used as a diafiltration medium (diawater) of step c). It is alternatively possible to use tap water or fractions from different membrane processes of milk, such as NF permeate, UF permeate, RO retentate, or chromatographically separated lactose fraction. In an embodiment of the invention, the NF permeate obtained from the nanofiltration of milk is used as a diafiltration medium. In a preferred embodiment of the invention, said NF permeate is NF permeate of the UF permeate obtained in step b) of the method according to the invention. The milk-based product of the invention is then either a lactose-free or low-lactose product.

The heat treatment of the MF retentate obtained by the method of the invention and the hydrolysing of lactose thereof are conventional procedures performed for milk products and belong to the knowledge of a person skilled in the art.

For standardizing the protein content of the MF retentate substantially free of whey proteins, manufactured by the method of the invention, the UF permeate fraction obtained in the method of the invention may be used. The protein content may also be standardized by other type of UF permeate obtained in the ultrafiltration of milk and not necessarily derived from the microfiltration step.

The protein content of the MF retentate may also be adjusted by means of the NF permeate. Simultaneously, the lactose content of the product may be adjusted. The NF permeate is preferably NE permeate obtained in the method of the invention. It is also possible to use other type of NF permeate, such as one obtained from the nanofiltration of milk or the nanofiltration of the ultrafiltration permeate of milk.

At least a portion of the MF retentate obtained in the invention, which is optionally heat-treated, lactose hydrolyzed and/or standardized in respect of protein content, can be combined with the milk raw material so as to provide a milk-based product which does not scorch during heating.

In an aspect, the invention provides a milk-based product which does not scorch, having a content of less than 0.10 g β-lactoglobulin/100 g milk-based product. In an embodiment of the invention, the content of (β-lactoglobulin is less than 0.09 g/100 g milk-based product. In another embodiment of the invention, the content is at most 0.02 g/100 g milk-based product.

By means of the membranes used in the filtration techniques in the invention, the total whey protein depletion of about up to 94% is typically achieved. Preferably, the total whey protein depletion is about 58% to 76%. Depletion of β-lactoglobulin is typically in the range of 77% to 95% based on the total amount of β-lactoglobulin of the milk raw material. However, it is evident that along with continuous developments in respect of the membrane capacity even a complete depletion of the whey proteins and β-lactoglobulin will be achieved.

An example of a preferred embodiment of the invention is a milk that does not scorch and has a protein content of 3.5% and that contains 0.10% of undenatured whey protein, α-lactalbumin in an amount of 0.02 g/100 ml, and β-lactoglobulin in an amount of 0.02 g/100 ml (Table 1; Example 1). The milk raw material containing 0.22% of fat contained 0.42% of undenatured whey protein, 0.13 g/100 ml of a-lactalbumin and 0.32 g/100 ml of β-lactoglobulin.

The invention also relates to the use of the above milk-based product, from which whey proteins have been substantially removed, as a milk product to be heated or for food to be heated, such as porridge, pudding or cocoa drink.

The following examples describe modes of carrying out the invention, but do not restrict the invention to said product applications only.

Example 1

Milk was microfiltrated with a Synder FR (Synder Filtration, USA) filtration membrane in such a manner that the milk was concentrated at a rate of 5 to 25 l/m$^2$ h in the pressure range of 0.1 to 1.5 bar at a filtration temperature of 45 to 55° C. by a factor of 3.5 to 4.5 times by volume. The MF permeate produced in the microfiltration was ultrafiltrated with DSS GR61PP (Alfa Laval AS, Denmark) membranes (5 to 20 kDa) at a rate of 5 to 25 l/m$^2$ h in the pressure range of 1 to 5 bar at 45 to 55° C. to 2% of the original volume. After the concentration step, the milk was diafiltrated by adding ultrafiltration permeate of the milk in the amount of 1.5 to 2 times the original volume. The diafiltration was performed by adding ultrafiltration permeate at the same rate at which MF permeate (5 to 25 l/m$^2$ h, pressure range 0.1 to 1.5 bar) was produced.

After the diafiltration step, ultrafiltration permeate of the milk was added to the milk concentrate obtained as the MF retentate so that the protein content of the milk corresponded to that of the original milk. In other words, the milk was diluted to correspond to the original protein content of the original milk.

Samples were taken from the feed, MF permeate and micro- and diafiltrated milk (end product, i.e. MF retentate), of which NPN (non-protein nitrogen) compounds, fat, lactose, ash, dry matter, protein and undenatured whey protein as well as α-lactalbumin and β-lactoglobulin were determined. The results are shown in Table 1.

TABLE 1

Composition of feed, end product (MF retentate) and MF permeate (Synder FR, 45 to 55° C.)

| Composition | Feed (skim Milk) | Milk-based product (MF retentate) of the invention | MF permeate |
|---|---|---|---|
| NPN (mg/g) | 0.30 | 0.28 | 0.27 |
| Fat (%) | 0.22 | 0.24 | 0.02 |
| Lactose (%) | 4.68 | 4.28 | 4.46 |
| Ash (%) | 0.76 | 0.77 | 0.46 |
| Dry matter (%) | 9.09 | 8.90 | 5.35 |
| Protein (%) | 3.41 | 3.50 | 0.32 |
| Undenatured whey protein (%) | 0.42 | 0.10 | 0.12 |
| α-lactalbumin (g/100 ml) | 0.13 | 0.02 | 0.02 |
| β-lactoglobulin (g/100 ml) | 0.32 | 0.02 | 0.10 |

With the above filtration system, over 90% of the β-lactoglobulin of the milk could be removed. β-lactoglobulin is a heat-sensitive whey protein of milk (the portion of β-lactoglobulin in the whey proteins of milk is 80%), which reacts to heat treatments by denaturation. The rest of the milk's chemical composition does not significantly change during the microfiltration process, as can be seen from Table 1. A considerable reduction in the amount of milk's β-lactoglobulin reduces the changes in the chemical and organoleptic quality of milk in such treatments in which milk is cooked or maintained heated at above 65° C.

To ensure shelf life, the milk was ultra heat treated (142° C., 2 seconds) and packed aseptically in Tetra Brik Aseptic packages (0.2 l).

Example 2

The properties of the milk-based product (MF retentate) manufactured in Example 1 were tested with the following cooking tests.

Milk Cooking Test.

400 mL of milk are poured to a thick-bottomed steel pot and heated on a stove with maximum power (power stage No. 6) to the boiling point. The heating is stopped when the milk starts to rise in the pot (a typical reaction when milk starts to boil). The milk is poured immediately out of the pot and the pot is rinsed with cold water. The scorching at the bottom of the pot is examined visually.

Rice Porridge Test.

200 mL of water are heated to the boiling point. 200 mL of porridge rice (Risella) are added. The porridge is cooked for 2 minutes and stirred actively all the time, whereby the water is absorbed in the rice. One liter of milk is added and the porridge is cooked over a low heat (power stage 3 to 4) for 40 minutes. The rice porridge is emptied from the pot and the pot is rinsed. The scorching at the bottom of the pot is examined visually.

Both tests were conducted with both the milk-based product of the invention and the conventional pasteurized skim milk (Valio Oy). The tests showed clearly that in the case of the milk-based product of the invention scorching was very mild, whereas the conventional skim milk burnt on the bottom much more easily, especially in the milk cooking test.

The tests were repeated when milk was 6 weeks old. The test results were similar. The milk-based product of the invention thus maintains its properties during storage.

Example 3

The milk-based product manufactured by the method described in Example 1 was mixed in different proportions with reference milk, which is normal pasteurized skim milk (0.05% of fat). The aim was to find out how much whey proteins must be removed in order to prevent the scorching.
Mixing ratios were as follows:
1) Milk of the invention 95%, skim milk 5%
2) Milk of the invention 90%, skim milk 10%
3) Milk of the invention 85%, skim milk 15%
4) Milk of the invention 80%, skim milk 20%
5) Milk of the invention 77.5%, skim milk 22.5%
6) Milk of the invention 75%, skim milk 25%
7) Milk of the invention 70%, skim milk 30%
8) Milk of the invention 60%, skim milk 40%
9) Milk of the invention 50%, skim milk 50%

A milk cooking test, as was described in Example 2, was performed for the milk mixtures. It was expectable that the scorching would gradually increase as the portion of skim milk in the mixture increases, because the β-lg content of the mixture becomes gradually higher. Surprisingly, it was detected that the scorching remained at a low level until mixture No. 4 (the portion of skim milk was 5 to 20%). When the portion of skim milk was at least 22.5% (22.5 to 50%), the scorching of the milk mixture increased dramatically. It was surprising that the scorching did not depend linearly on the β-lg content but had a sharp turning point at which the scorching began. The result was confirmed by repetitions.

The results of the milk cooking test are shown in Table 2. The scorching was assessed visually with a scale from 0 to 100, whereby 5 represents very mild scorching and 95 very intense scorching.

The calculated β-lg amounts of the previously mentioned mixtures 1 to 9 are also shown in Table 2.

TABLE 2

β-lactoglobulin content and scorching of milk

| Mixture | | | |
|---|---|---|---|
| Milk-based product of the invention (%) | Conventional milk (%) | β-lg content (g/100g) | Scorching |
| 95 | 5 | 0.04 | 5 |
| 90 | 10 | 0.05 | 5 |
| 85 | 15 | 0.07 | 5 |
| 80 | 20 | 0.08 | 5 |
| 77.5 | 22.5 | 0.09 | 5 |
| 75 | 25 | 0.10 | 95 |
| 70 | 30 | 0.11 | 95 |
| 60 | 40 | 0.14 | 95 |
| 50 | 50 | 0.17 | 95 |

In calculatory terms, mixture No. 5 contains 25% of the original β-lg amount of milk, i.e. about 0.09 β-lg in 100 g milk. The results show that it is not necessary to remove the β-lactoglobulin from milk in order to substantially prevent the milk from scorching, but the scorching is avoided when milk contains less than 0.10 g of β-lactoglobulin/100 g milk.

Example 4

The fat content of the milk used in Example 2 was 0.24%. The aim was to examine whether the result obtained in Example 2 was due to a different fat content. As described above, it is generally known that fat decreases the tendency of scorching. The cooking test was performed by using as reference milk a mixture of skim milk and semi-skimmed milk in a proportion by which a fat content of 0.24% was achieved for the reference milk.

When estimated visually, it was found out that a small difference in the fat content does not affect the scorching.

Example 5

A milk cooking test as described in Example 2 was performed for the milk-based product manufactured in Example 1 and for conventional skim milk, this time by using a coated saucepan. The result was that the milk-based product of the invention did not burn on the bottom, as expected, but instead the conventional skim milk burnt intensely on the bottom. It was easier to wash the coated saucepan than the uncoated steel pot.

A coated saucepan may thus solve one of the problems related to scorching of milk, but the burnt flavour and visual defects still remain. The problem of appearance defects may become even bigger, because the burnt matter may be detached from the bottom of the cookware more easily when the food is being stirred.

Example 6

The filtration method of Example 1 was used for preparing two batches of milk, the protein contents of which were standardized by the ultrafiltration permeate to 3.0% (batch 1) and to 2.8% (batch 2). The latter content corresponds to the natural casein content of milk, which means that the removal of whey proteins is not compensated for by casein. The β-lg content of batch 1 was 0.02 g/100 g milk and the β-lg content of batch 2 was 0.03 g/100 g milk. The fat content of both batches was 0.05%. In this case, the milks were not ultra heat treated but pasteurized (72° C./15 sec).

A milk cooking test and a rice porridge test, as described in Example 2, were performed for the milks.

As a result, it was detected that scorching took place to some extent, in the milk cooking test for batch 1, in the rice porridge test for batch 2. However, the scorching was not nearly as intense as in the case of the conventional skim milk.

The organoleptic quality of the milk-based products of the invention was evaluated by two methods. The evaluation was carried out by experienced assessors (expert panel) who did not know which kind of samples were to be assessed:
1) the general quality standard of milks was determined by means of quality points
2) differences in some organoleptic properties between milks were determined by a descriptive analysis (off-taste intensity, richness, freshness, cooked flavour)

No significant statistical differences were detected between the milks. The removal of whey proteins did not thus affect the taste of milk. It may also be detected from the results that the total protein content did not affect the organoleptic quality although it was different in the case of different milks: for the conventional skim milk it was 3.3% and for the test milks it was 3.0% and 2.8%. As to the organoleptic quality, it is thus not necessary to compensate for the removal of whey proteins from milk by increasing the casein content.

The invention claimed is:
1. A method for manufacturing a milk-based product which does not scorch, the method comprising the following steps of:

a) concentrating a milk raw material by microfiltration to provide an MF retentate fraction and an MF permeate fraction,
b) ultrafiltrating the obtained MF permeate fraction to provide a UF retentate fraction and a UF permeate fraction,
c) circulating at least a portion of the obtained UF permeate fraction back to the microfiltration as a diafiltration medium, and
d) recovering the MF retentate obtained from step c),
(e) providing the milk-based product comprising the MF retentate obtained from step d), having a β-lactoglobulin content of less than 0.10 g/100 g milk-based product.

2. The method as claimed in claim 1, wherein part of the UF permeate is led to nanofiltration to provide a NF permeate and a NF retentate.

3. The method as claimed in claim 1, wherein the total concentration degree in the filtration steps is over 4.

4. The method as claimed in claim 1, wherein the protein content of the MF retentate is standardized by means of the UF permeate obtained in step b).

5. The method as claimed in claim 2, wherein the protein and lactose content of the MF retentate is standardized by means of the NF permeate.

6. The method as claimed in claim 1, wherein the MF retentate is subjected to heat-treatment, lactose hydrolysis and/or protein content standardization.

7. The method as claimed in claim 1, wherein the milk-based product further comprises the milk raw material.

8. The method as claimed in claim 1, wherein at least a portion of the MF retentate subjected to heat-treatment, lactose hydrolysis and/or protein content standardization is combined with the raw milk material.

9. The method as claimed in claim 1, wherein the total concentration degree in the filtration steps is 20 to 70.

10. The method as claimed in claim 1, wherein the total concentration degree in the filtration steps is 50 to 70.

* * * * *